(No Model.)

J. McLAUGHLIN.
INSCRIPTION DEVICE FOR UMBRELLA STICKS.

No. 436,799. Patented Sept. 23, 1890.

Witnesses:

Inventor:
John McLaughlin
by Chapin & Co.
Atty's

THE NORRIS PETERS CO., PHOTO-LITHO., WASHINGTON, D. C.

UNITED STATES PATENT OFFICE.

JOHN McLAUGHLIN, OF WESTFIELD, MASSACHUSETTS.

INSCRIPTION DEVICE FOR UMBRELLA-STICKS.

SPECIFICATION forming part of Letters Patent No. 436,799, dated September 23, 1890.

Application filed April 28, 1890. Serial No. 349,804. (No model.)

*To all whom it may concern:*

Be it known that I, JOHN MCLAUGHLIN, a citizen of the United States, residing at Westfield, in the county of Hampden and State of Massachusetts, have invented new and useful Improvements in Inscription Devices for Umbrella-Sticks and Similar Articles, of which the following is a specification.

This invention relates to improvements in inscription devices for sticks of umbrellas, canes, whips, and similar articles, the object thereof being to provide a means for retaining the inscription-bearing sheet or plate on the umbrella-stick or cane for protecting the same at its edges, and also as to the surface thereof, and all to be capable of economical production and easy application.

The nature and composition of the invention will be more fully ascertained on reference to the accompanying drawings and to the subjoined claims.

Figure 1:
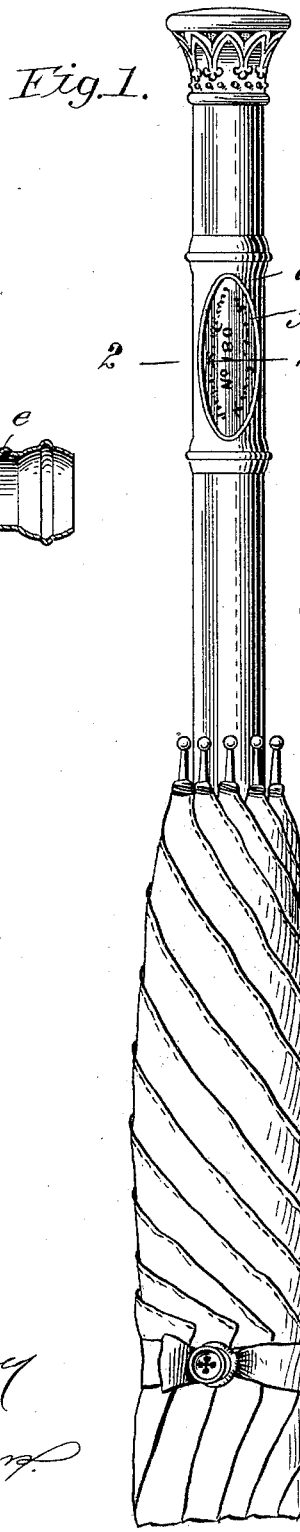
Figure 3:
Figure 4:
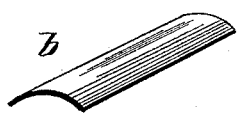
Figure 5:
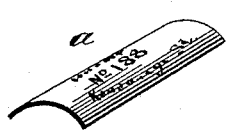
Figure 2:
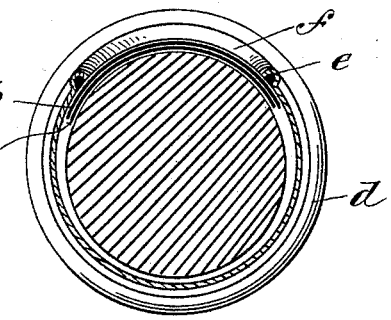
Figure 6:
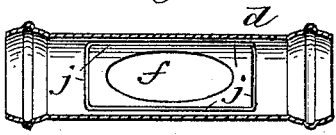

In the drawings, Figure 1 shows the inscription-bearing sheet and ferrule as applied on the stick of an umbrella. Fig. 2 is an enlarged cross-section taken on line 2 2, Fig. 1. Fig. 3 is a sectional view of the inclosing and retaining ferrule. Figs. 4 and 5 are representations of the transparent covering-sheet and the inscription-sheet covered thereby. Fig. 6 is a view to illustrate a feature hereinafter referred to.

The inscription is usually printed upon a sheet $a$ of white paper, which is more or less of the shape indicated in Fig. 5. This is then laid upon the side of the umbrella-stick, cane, &c., and, if desired, may be pasted or cemented thereon, and is overlaid by the sheet $b$ of transparent material, which is concaved to conform to the surface of the stick.

The sheets $a$ and $b$ are inclosed by the ferrule $d$, which has an aperture $f$ in its side, through which the inscription is visible. The border of the aperture in the ferrule is preferably ribbed or beaded, as at $e$, and the ends of the ferrule are also usually beaded or otherwise ornamentally formed.

The transparent covering for overlying the inscription-bearing sheet is preferably transparent celluloid, although I may employ other transparent sheet or plate material, as glass, mica, or oiled silk.

The ferrule may be provided with an inwardly-extended rib $j$, which surrounds the aperture a short distance from the borders thereof, as indicated in the views, Figs. 6 and 7, to constitute a seat, in which the inscription-sheet or the overlying transparent cover, or both, may rest, all so that any shifting or moving of the ferrule on the stick will not destroy the proper arrangement of one or both of the sheets $a$ $b$ relatively to the aperture in the ferrule.

What I claim as my invention is—

1. An inscription device for umbrella-sticks, canes, or whips, consisting of a sheet bearing the inscription, an overlying transparent sheet, and a ferrule having a length greater than the said label and transparent covering and adapted to embrace the stick and inclose the edge portions of said inscription and transparent sheets, but provided with an aperture through which the inscription is visible, substantially as described.

2. The combination, with an umbrella-stick, cane, or whip having an inscription on the side thereof, of a sheet of transparent material overlying the said inscription and a ferrule having a length greater than the said label and transparent covering and adapted to embrace the stick and inclose the edge portions of said inscription and transparent sheets, but provided with an aperture through which the inscription is visible, substantially as described.

3. In an inscription device for umbrella-sticks, canes, &c., a ferrule having the aperture through its side and provided outside of the borders of said aperture with the inwardly-projected rib $j$ to form an internal seat or rest, substantially as and for the purpose described.

JOHN McLAUGHLIN.

Witnesses:
WM. S. BELLOWS,
G. M. CHAMBERLAIN.